United States Patent
Park (10) Patent No.: US 8,580,412 B2
(45) Date of Patent: Nov. 12, 2013

(54) BATTERY PACK

(75) Inventor: Kwangyoung Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 213 days.

(21) Appl. No.: 13/174,614

(22) Filed: Jun. 30, 2011

(65) Prior Publication Data

US 2012/0121940 A1 May 17, 2012

(30) Foreign Application Priority Data

Nov. 12, 2010 (KR) .................. 10-2010-0112509

(51) Int. Cl.
*H01M 2/34* (2006.01)
*H01M 10/42* (2006.01)

(52) U.S. Cl.
USPC ............................................................. 429/7

(58) Field of Classification Search
USPC .............................................................. 429/7
See application file for complete search history.

(56) References Cited

U.S. PATENT DOCUMENTS

| | | | |
|---|---|---|---|
| 2006/0019155 A1* | 1/2006 | Seman et al. | 429/159 |
| 2009/0086398 A1 | 4/2009 | Jang | |
| 2009/0154048 A1 | 6/2009 | Jang et al. | |
| 2010/0098974 A1 | 4/2010 | Kim et al. | |
| 2010/0136422 A1* | 6/2010 | Koh et al. | 429/178 |

FOREIGN PATENT DOCUMENTS

| | | | |
|---|---|---|---|
| JP | 08-031460 A | | 2/1996 |
| JP | 2002216722 A | * | 8/2002 |
| JP | 2004-171895 A | | 6/2004 |
| JP | 2010-003466 A | | 1/2010 |
| KR | 10-2009-0032377 A | | 4/2009 |
| KR | 10-2009-0064961 A | | 6/2009 |
| KR | 10-2010-0044487 A | | 4/2010 |
| KR | 2010-0044487 A | | 4/2010 |

OTHER PUBLICATIONS

Office Action dated Mar. 9, 2012, issued in Korean Priority Application No. 10-2010-0112509, 6 pages.
Machine English Translation of JP08-031460A, 9 pages.
Machine English Translation of JP2004-171895A, 19 pages.
Machine English Translation of JP2010-003466A, 15 pages.

* cited by examiner

*Primary Examiner* — Gregg Cantelmo
(74) *Attorney, Agent, or Firm* — Christie, Parker & Hale, LLP (57) ABSTRACT

In a battery pack, a component for attaching a secondary protection device to a bare cell may be omitted to reduce manufacturing costs and improve productivity. The battery pack includes a bare cell, a flexible printed circuit board in which at least one portion thereof contacts the bare cell, the flexible printed circuit board being electrically coupled to the bare cell through a lead pattern surrounded by an insulation cover, a secondary protection device on the flexible printed circuit board, the secondary protection device being electrically coupled to the flexible printed circuit board through the lead pattern, and a protective circuit module electrically coupled to the flexible printed circuit board through the lead pattern.

12 Claims, 7 Drawing Sheets

BATTERY PACK

CROSS-REFERENCE TO RELATED APPLICATION

This application claims priority to and the benefit of Korean Patent Application No. 10-2010-0112509 filed in the Korean Intellectual Property Office on Nov. 12, 2010, the entire content of which is incorporated herein by reference.

BACKGROUND

1. Field

Embodiments of the present invention relate to a battery pack.

2. Description of Related Art

In a process for manufacturing a battery pack, a process in which a secondary protection device is attached to each of bare cells constituting the battery pack to prevent the bare cells from being over-heated is performed. To attach the secondary protection device to each of the bare cells, one nickel tab for electrically coupling the bare cell to the secondary protection device and the other nickel tab for electrically coupling the secondary protection device to a protective circuit module (PCM) may be used. In addition, an insulation tape for electrically insulating one component from other components may be additionally used.

SUMMARY

Aspects of embodiments according to the present invention are directed toward a battery pack in which attachment processes of a nickel tab for attaching a secondary protection device to each of bare cells and an insulation tape for insulating components from each other may be omitted to reduce production costs and improve productivity.

According to an embodiment, a battery pack includes: a bare cell; a flexible printed circuit board including at least one portion contacting with the bare cell, the flexible printed circuit board being electrically coupled to the bare cell through a lead pattern surrounded by an insulation cover; a secondary protection device on the flexible printed circuit board, the secondary protection device being electrically coupled to the flexible printed circuit board through the lead pattern; and a protective circuit module electrically coupled to the flexible printed circuit board through the lead pattern.

The lead pattern constituting the flexible printed circuit board may include a first lead pattern, a second lead pattern, and a third lead pattern.

The first lead pattern may be coupled to a first tab of the secondary protection device, the second lead pattern may be coupled to a second tab of the secondary protection device and a negative electrode tab of the bare cell, and the third lead pattern may be coupled to a positive electrode tab of the bare cell. An end of the first lead pattern and an end of the second lead pattern may be on a contact part at which a first extending portion of the bare cell overlaps a portion of the flexible printed circuit board.

The insulation cover may have a first opening at a position at which the first lead pattern is coupled to a first tab of the secondary protection device, a second opening at a position at which the second lead pattern is coupled to a second tab of the secondary protection device, a third opening at a position at which the second lead pattern is coupled to a negative electrode tab of the bare cell, and a fourth opening at a position at which the third lead pattern is coupled to a positive electrode tab of the bare cell.

The secondary protection device may be on a contact part at which a first extending portion of the bare cell overlaps a portion of the flexible printed circuit board. Also, a heat transfer unit for transferring heat generated in the bare cell to the secondary protection device may be in a space between the secondary protection device and a first extending surface of the bare cell. The heat transfer unit may include aluminum (Al) or silicon carbide (SiC).

The protective circuit module may include a first connection part and a second connection part, wherein the first connection part may be coupled to the first lead pattern, and the second connection part may be coupled to the third lead pattern.

The bare cell may include a plurality of bare cells. In this case, the flexible printed circuit board may include a plurality of flexible printed circuit boards, which is electrically coupled to the plurality of bare cells, respectively. Also, the plurality of flexible printed circuit boards may be integrally formed in one body.

The secondary protection device may include a plurality of secondary protection devices, which is on first extending portions of the plurality of bare cells, respectively.

BRIEF DESCRIPTION OF THE DRAWINGS

The accompanying drawings are included to provide a further understanding of the present invention, and are incorporated in and constitute a part of this application. The drawings illustrate exemplary embodiments of the present invention and, together with the description, serve to explain principles of the present invention. In the drawings.

DETAILED DESCRIPTION OF THE EMBODIMENTS

Example embodiments will now be described more fully hereinafter with reference to the accompanying drawings; however, they may be embodied in different forms and should not be construed as limited to the embodiments set forth herein. Rather, these embodiments are provided so that this application will be thorough and complete, and will fully convey the scope of the present invention to those skilled in the art.

Figure 1:
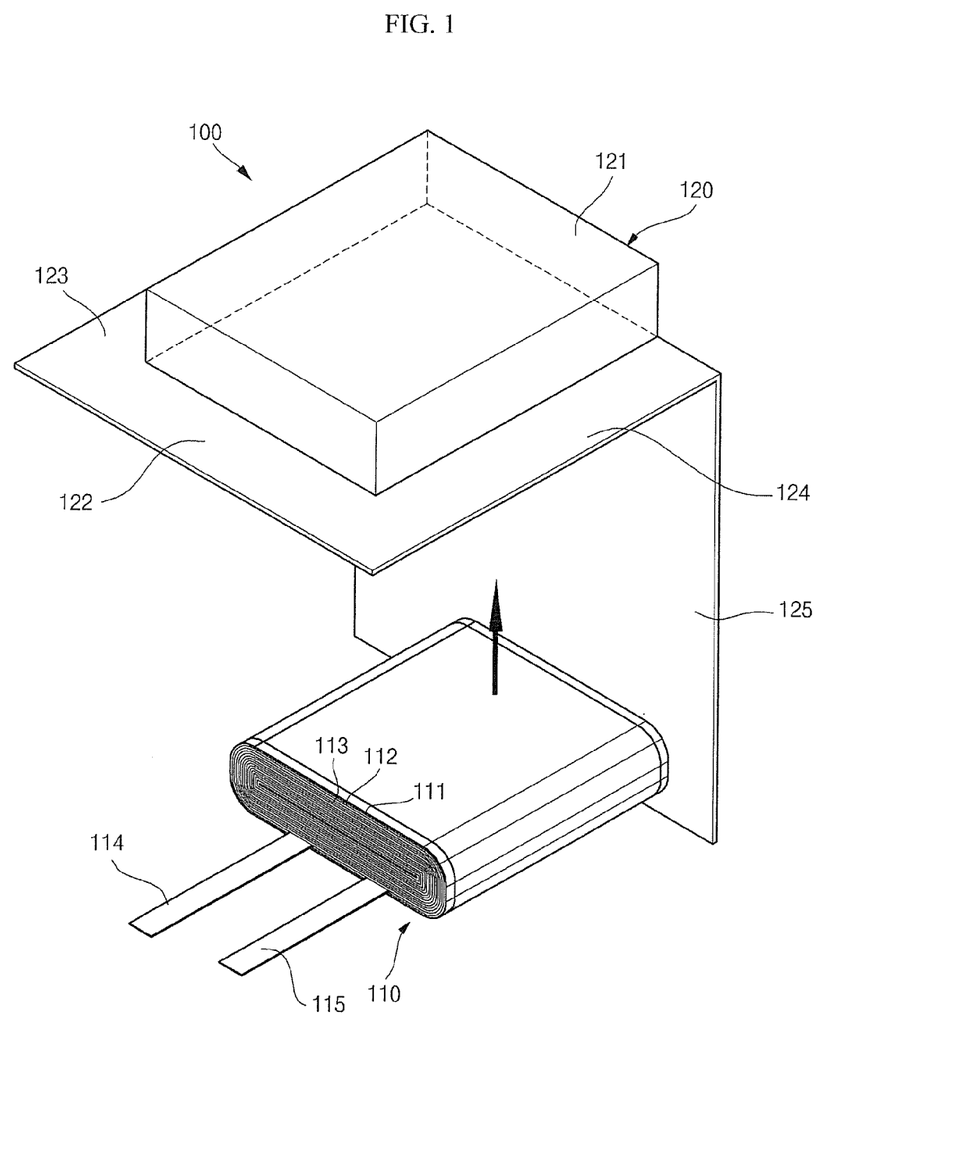
FIG. 1 is an exploded perspective view of an electrode assembly and a case according to an embodiment.
Figure 2:
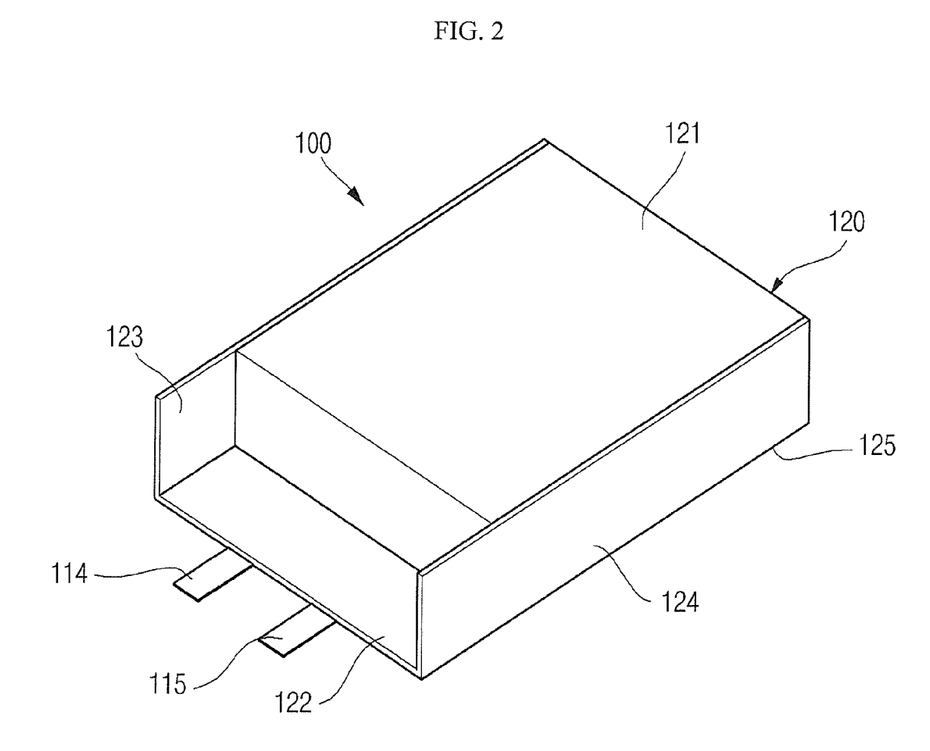
FIG. 2 is a perspective view of a bare cell according to an embodiment.
Figure 3:
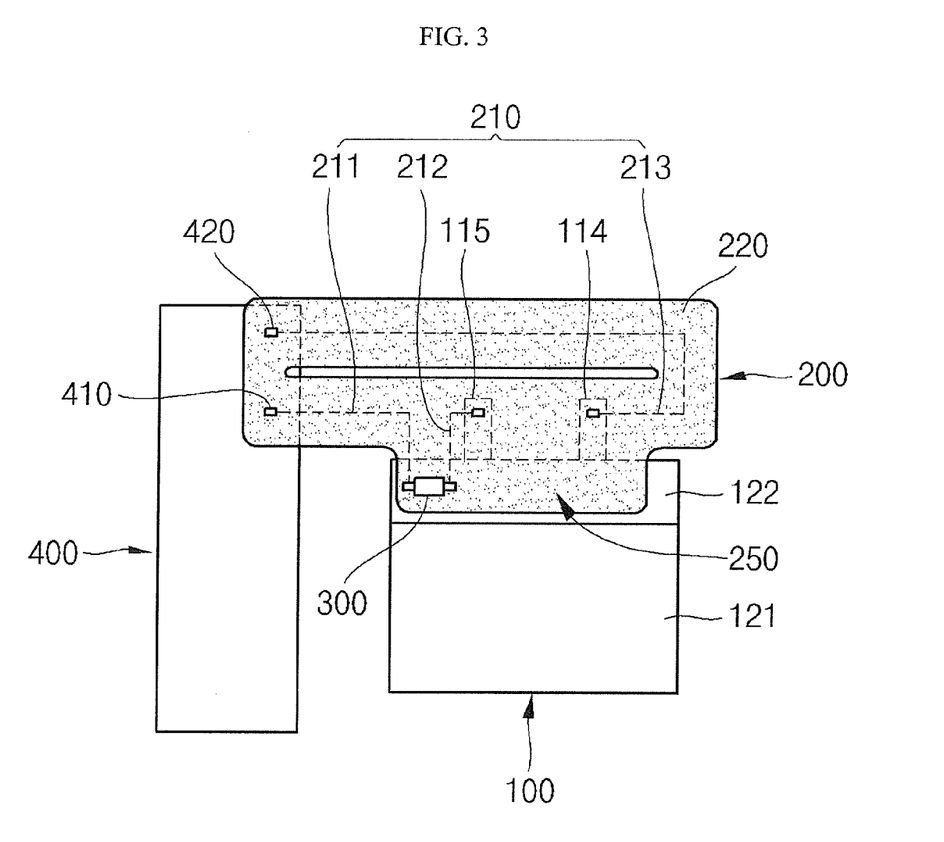
FIG. 3 is a plan view illustrating an electrical connection relationship between components of a battery pack according to an embodiment.
Figure 4:
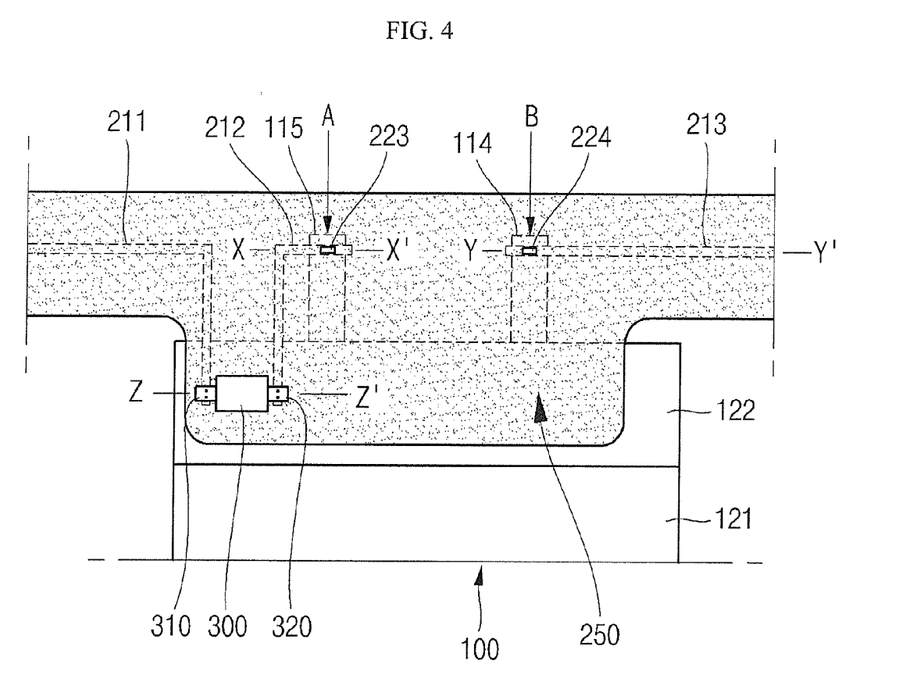
FIG. 4 is an enlarged view illustrating a portion of FIG. 3.
Figure 5A:
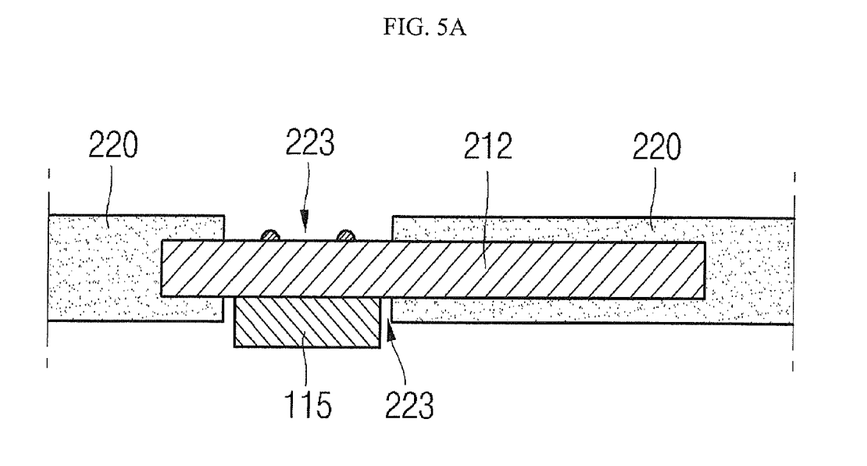
FIG. 5A is an enlarged sectional view taken along the line X-X' of FIG. 4 when viewed from a direction A.
Figure 5B:
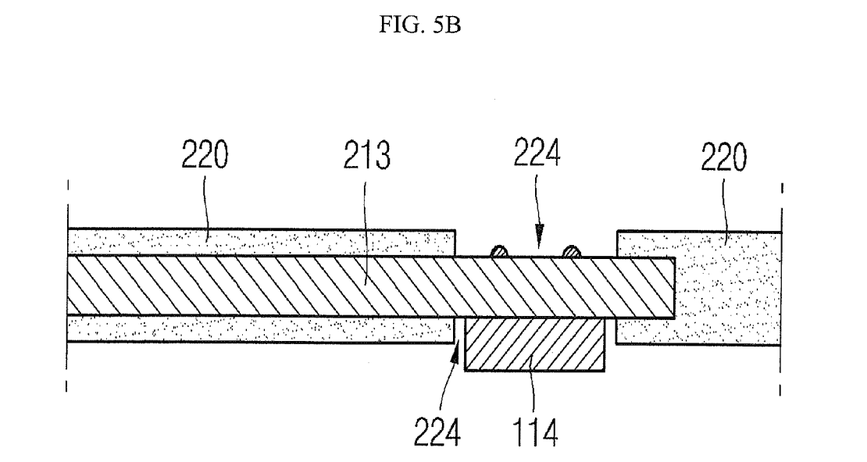
FIG. 5B is an enlarged sectional view taken along the line Y-Y' of FIG. 4 when viewed from a direction B.
Figure 6:
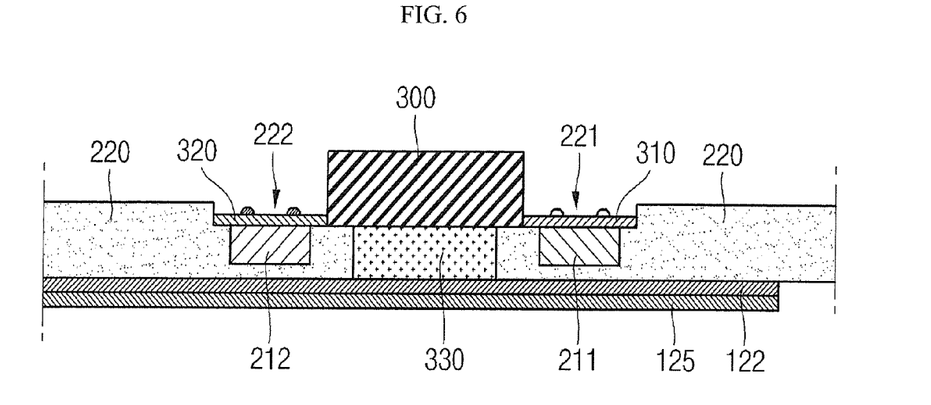
FIG. 6 is an enlarged sectional view taken along the line Z-Z' of FIG. 4 when viewed from a direction M.

FIG. 1 is an exploded perspective view of an electrode assembly and a case according to an embodiment, and FIG. 2 is a perspective view of a bare cell according to an embodiment. Also, FIG. 3 is a plan view illustrating an electrical connection relationship between components of a battery pack according to an embodiment, and FIG. 4 is an enlarged view illustrating a portion of FIG. 3. Also, FIG. 5A is an enlarged sectional view taken along the line X-X' of FIG. 4 when viewed from a direction A, and FIG. 5B is an enlarged sectional view taken along the line Y-Y' of FIG. 4 when viewed from a direction B. FIG. 6 is an enlarged sectional view taken along the line Z-Z' of FIG. 4 when viewed from a direction M. Hereinafter, a battery pack according to an embodiment will be described with reference to FIGS. 1 to 6.

Referring to FIGS. 3 and 4, a battery pack according to an embodiment includes a bare cell 100 (shown in FIG. 1), a flexible printed circuit board (FPCB) 200 electrically coupled to the bare cell 100, a secondary protection device 300 electrically coupled to the FPCB 200, and a protective circuit module 400.

Referring to FIGS. 1 and 2, the bare cell 100 includes an electrode assembly 110 and a case 120 configured to receive the electrode assembly 110.

The electrode assembly 110 includes a positive electrode plate 111, a negative electrode plate 112, and a separator 113. In addition, the electrode assembly 110 may further include a positive electrode tab 114 protruding from a non-coating portion (not shown) of the positive electrode plate 111 and a negative electrode tab 115 protruding from a non-coating portion of the negative electrode plate 112. Also, the separator 113 may be located between the positive electrode plate 111 and the negative electrode plate 112. Here, the positive electrode plate 111, the separator 113, and the negative electrode plate 112 may be stacked on one another. Then, the positive electrode plate 111, the separator 113, and the negative electrode plate 112, which are stacked on one another, may be wound in a jelly-roll type to manufacture the electrode assembly 110. The protruding positions of the positive electrode tab 114 and the negative electrode tab 115 may be exchanged with each other. Thus, polarities of the electrode assembly may be reversed.

The case 120 includes a receiving part 121 that provides a space for receiving the electrode assembly 110, first, second, and third extending portions 122, 123, and 124 extending from the receiving part 121, and a cover part 125 for covering an opened lower space of the receiving part 121.

The first, second, and third extending portions 122, 123, and 124 extend from the receiving part 121 that receives the electrode assembly 110. Then, the first, second, and third extending portions 122, 123, and 124 are thermally fused with edges of the cover part 125, respectively. Here, the positive electrode tab 114 and the negative electrode tab 115 protrude between the first extending portion 122 and the cover part 125. Also, after the second and third extending portions 123 and 124 are thermally fused with the edges of the cover part 125, the second and third extending portions 123 and 124 are folded in a direction toward the receiving part 121. Thus, the second and third extending portions 123 and 124 are closely attached to side surfaces of the receiving part 121 to manufacture the bare cell 100.

Referring again to FIGS. 3 and 4, the FPCB 200 includes a lead pattern 210 and an insulation cover 220 surrounding the lead pattern 210. Also, at least one portion of the FPCB 200 is on the first extending portion 122 of the bare cell 100 to form a contact part 250 that is a portion at which the FPCB 200 overlaps the first extending portion 122. Also, the FPCB 200 electrically couples the bare cell 100 to the protective circuit module 400.

The lead pattern 210 includes a first lead pattern 211, a second lead pattern 212, and a third lead pattern 213. Also, the lead pattern 210 may be formed of copper, but it is not limited thereto. For example, the lead pattern 210 may be formed of a suitable conductive material, which may be coated with the insulation cover 220.

The first lead pattern 211 has one end electrically coupled to the protective circuit module 400 and the other end electrically coupled to the secondary protection device 300. Also, the other end of the first lead pattern 211 may be on the contact part 250.

The second lead pattern 212 has one end electrically coupled to the secondary protection device 300 and the other end electrically coupled to the negative electrode tab 115 of the bare cell 100. Also, the one end of the second lead pattern 212 may be on the contact part 250.

The third lead pattern 213 has one end electrically coupled to the positive electrode tab 114 of the bare cell 100 and the other end electrically coupled to the protective circuit module 400. Although the lead patterns 211, 212, 213 are spaced from each other in FIGS. 3 and 4, the present invention is not limited thereto. For example, as described below, since the lead patterns 211, 212, 213 are coated with the insulation cover 220, the lead patterns 211, 212, 213 may be integrally formed and coupled to each other.

The insulation cover 220 may surround the lead patterns 211, 212, 213 to insulate the lead patterns 211, 212, 213 from each other within the battery pack. That is, the lead pattern 210 is manufactured in a desired shape according to an electrical connection relationship between components within the battery pack, and the lead pattern 210 is coated with the insulation cover 220 to manufacture the FPCB 200.

Also, referring to FIGS. 5A, 5B, and 6, the insulation cover 220 includes openings 221, 222, 223, and 224 for welding at portions of the lead pattern 210 to be electrically coupled to other components. The openings may include a first opening 221, a second opening 222, a third opening 223, and a fourth opening 224, which are distinguished according to formation positions thereof.

Referring to FIG. 6, the first opening 221 is defined at a position at which the other end of the first lead pattern 211 is electrically coupled to a first tab 310 (that will be described later) of the secondary protection device 300. Also, the second opening 222 is defined at a position at which the one end of the second lead pattern 212 is electrically coupled to a second tab 320 (that will be described later) of the secondary protection device 300.

Referring to FIG. 5A, the third opening 223 is defined at a position at which the other end of the second lead pattern 212 is electrically coupled to the negative electrode 115 of the bare cell 100.

Also, referring to FIG. 5B, the fourth opening 224 is defined at a position at which the one end of the third lead pattern 213 is electrically coupled to an end of the positive electrode tab 114 of the bare cell 100.

Also, in other embodiments, an opening may be defined at a portion at which the FPCB 200 and the protective circuit module 400 are welded to each other to electrically couple them to each other.

Referring to FIGS. 3, 4, and 6, the secondary protection device 300 is on the FPCB 200. The secondary protection device 300 includes a first tab 310 on one end thereof and a second tab 320 on the other end thereof. Also, a thermal transfer unit 330 may be located in a space between the first extending portion 122 and the secondary protection device 300.

The secondary protection device 300 measures a temperature of the bare cell 100 to intercept a flow of a current when the bare cell 100 is over-heated, thereby preventing the temperature of the bare cell 100 from being further increased. Thus, the secondary protection device 300 is located adjacent to the bare cell 100. Also, the secondary protection device 300 may be directly installed on the bare cell 100. Also, in the bare cell 100, heating values of the electrode tabs 114 and 115 are the highest. Thus, the secondary protection device 300 may be located on the contact part 250 on which the first extending portion 122 from which the electrode tabs 114 and 115 protrude and the FPCB 200 overlap each other. A positive temperature coefficient (PTC) device may be used as the secondary protection device 300 for performing the above-described function. An operation in which the PTC device intercepts the current flow according to a temperature change of the battery may be reversible. That is, the PTC device may intercept the current flow when the temperature of the bare cell 100 is increased to be more than a reference temperature and allow the current to flow when the temperature of the bare cell 100 is decreased again.

Referring to FIG. 6, the first tab 310 contacts the other end of the first lead pattern 211 and is coupled to the first lead pattern 211 by the welding process through the first opening 221 defined in the insulation cover 220. The second tab 320 contacts the one end of the lead pattern 212 and is coupled to the second lead pattern 212 by the welding process through the second opening 222 defined in the insulation cover 220. In this case, the welding process may be a laser welding process. For performing a resistance welding process, a welding rod may contact bottom surface of the first and second lead patterns 211 and 212 as well as top surfaces of the first and second tabs 310 and 320. Thus, openings should be further defined also in a bottom surface of the insulation cover 220 at positions corresponding to those of the first and second openings 221 and 222. As a result, an additional process is used.

The heat transfer unit 330 is located between the secondary protection device 300 and the first extending portion 122 to transfer heat generated in the bare cell 100 to the secondary protection device 300 so that the secondary protection device 300 accurately measures a temperature of the bare cell 100. Thus, a portion of the insulation cover 220 located between the secondary protection device 300 and the first extending portion 122 is stripped off, and then, the heat transfer unit 330 having suitably high thermal conductivity is located at the stripped portion. The heat transfer unit 330 may be formed of aluminum (Al) or silicon carbide (SiC). However, the present invention is not limited to the above stated material of the heat transfer unit 330. For example, any suitable material having high thermal conductivity may be used as the material for the heat transfer unit 330.

Referring to FIG. 3, the protective circuit module 400 includes a first connection part 410 and a second connection part 420 to electrically couple the protection circuit module 400 to the FPCB 200. Also, the protective circuit module 400 is spaced from the bare cell 100. The first connection part 410 is coupled to the first lead pattern 211, and the second connection part 420 is coupled to the third lead pattern 213. Thus, the protective circuit module 400 is electrically coupled to the bare cell 100 and the secondary protection device 300 to control charging or discharge of the bare cell 100.

As described above, in the battery pack according to an embodiment, the bare cell 100, the secondary protection device 300, and the protective circuit module 400 are electrically coupled to each other through the FPCB 200 to improve productivity. That is, when compared to a case where portions at which electrical connection between the components is needed are coupled to each other using a lead tab and a coating process for insulation are separately performed, a process for manufacturing the battery pack according to an embodiment may be simplified and easily performed.

Also, in the battery pack according to an embodiment, since the secondary protection device 300 is located on the first extending portion 122 of the bare cell 100, the secondary protection device 300 may be accurately operated according to a temperature of the bare cell 100. Also, since the first and second tabs 310 and 320 of the secondary protection device 300 are directly coupled to the lead pattern 210 of the FPCB 200, the attachment process of the secondary protection device 300 may be simplified to improve the productivity and reduce material costs.

Hereinafter, a battery pack according to another embodiment will be described with reference to FIG. 7. The battery pack according to another embodiment is substantially similar to the battery pack according to the above described embodiment except that a plurality of bare cells are provided, and thus an electrical connection relationship is partially different from that of the battery pack according to the above described embodiment. Thus, in descriptions of another embodiment, duplicated explanations with the foregoing embodiment will be omitted.

Figure 7:
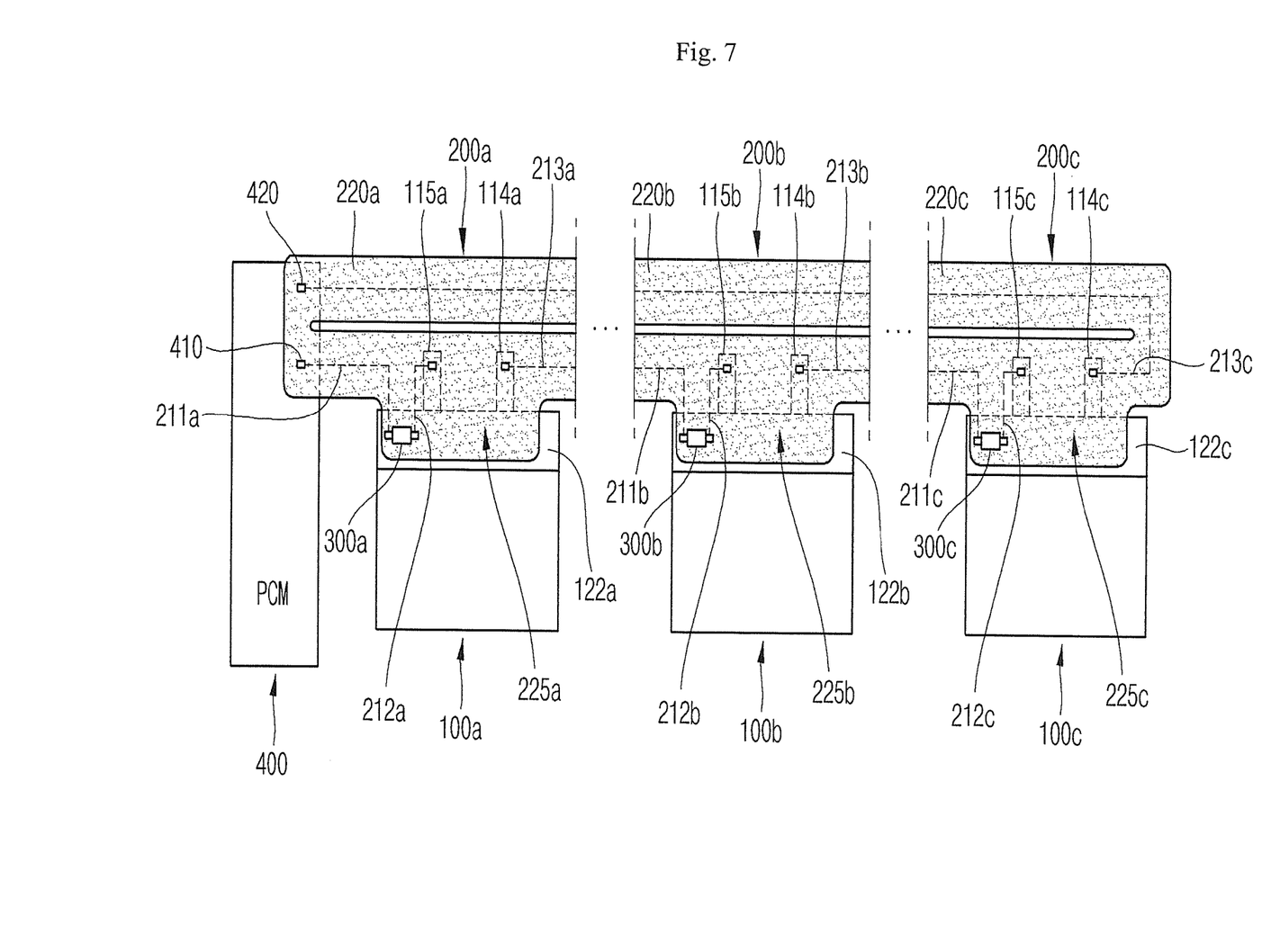
FIG. 7 is a plan view illustrating an electrical connection relationship between components of a battery pack according to another embodiment.

Referring to FIG. 7, a battery pack according to another embodiment includes a plurality of bare cells, a plurality of flexible printed circuit boards (FPCBs) respectively and electrically coupled to the plurality of bare cells, a plurality of secondary protection devices respectively and electrically coupled to the plurality of FPCBs, and a protective circuit module 400. Here, the plurality of bare cells includes a first bare cell 100a, a second bare cell 100b, and a third bare cell 100c. Also, the plurality of FPCBs includes a first FPCB 200a, a second FPCB 200b, and a third FPCB 200c. Also, the plurality of secondary protection devices includes a first secondary protection device 300a, a second secondary protection device 300b, and a third secondary protection device 300c. Although three bare cells are illustrated in FIG. 7 to describe the battery pack according to another embodiment, the present invention is not limited to the number of bare cells. Thus, two bare cells may be provided, or four or more cells may be provided.

The plurality of bare cells 100a, 100b, and 100c includes first extending portions 122a, 122b, and 122c, positive electrode tabs 114a, 114b, and 114c, and negative electrode tabs 115a, 115b, and 115c, respectively.

The plurality of FPCBs 200a, 200b, and 200c includes first lead patterns 211a, 211b, and 211c, second lead patterns 212a, 212b, and 212c, third lead patterns 213a, 213b, and 213c, insulation covers 220a, 220b, and 220c, and contact parts 250a, 250b, and 250c, respectively. Also, the plurality of FPCBs 200a, 200b, and 200c may be separately formed, and then electrically coupled to each other. Alternatively, the plurality of FPCBs 200a, 200b, and 200c may be integrally formed in one body.

Hereinafter, only the points different from the battery pack according to an embodiment in electrical connection relationships among the plurality of FPCBs 200a, 200b, and 200c will be described.

The other end of the third lead pattern 213a constituting the first FPCB 200a is directly coupled to the lead pattern of the adjacent FPCB in a direction of the second FPCB 200b. This is different from the battery pack according to the embodiment shown in FIG. 3 in which the other end of the third lead pattern 213 is directly coupled to the second connection part 420 of the protective circuit module 400.

One end of the first lead pattern 211b constituting the second FPCB 200b is directly coupled to the lead pattern of the adjacent FPCB in a direction of the first FPCB 200a. This is different from the battery pack according to the embodiment shown in FIG. 3 in which the one end of the first lead pattern 211 is directly coupled to the first connection part 410 of the protective circuit module 400. Also, the other end of the third lead pattern 213b constituting the second FPCB 200b is directly coupled to the lead pattern of the adjacent FPCB in a direction of the third FPCB 200*c*. This is different from the battery pack according to the embodiment shown in FIG. 3 in which the other end of the third lead pattern 213 is directly coupled to the second connection part 420 of the protective circuit module 400.

One end of the first lead pattern 211*c* constituting the third FPCB 200*c* is directly coupled to the lead pattern of the adjacent FPCB in a direction of the second FPCB 200*b*. This is different from the battery pack according to an embodiment in which the one end of the first lead pattern 211 is directly coupled to the first connection part 410 of the protective circuit module 400.

As described above, in the battery pack according to the embodiment shown in FIG. 7, the plurality of bare cells 100*a*, 100*b*, and 100*c*, the plurality of secondary protection devices 300*a*, 300*b*, and 300*c* respectively attached to the plurality of bare cells 100*a*, 100*b*, and 100*c*, and the protective circuit module 400 may be electrically coupled to each other through the FPCBs 200*a*, 200*b*, and 200*c* to improve the productivity. That is, when compared to a case where portions at which electrical connection between the components is needed are coupled to each other using a lead tab and a coating process for insulation are separately performed, a process for manufacturing the battery pack according to another embodiment may be simplified and easily performed.

Also, in the battery pack according to the embodiment shown in FIG. 7, since the secondary protection devices 300*a*, 300*b*, and 300*c* are respectively located on the first extending portions 122*a*, 122*b*, and 122*c* of the plurality of bare cells 100*a*, 100*b*, and 100*c*, the secondary protection devices 300*a*, 300*b*, and 300*c* may be accurately operated according to temperatures of the bare cells 100*a*, 100*b*, and 100*c*. Also, since the first and second tabs 310*a*, 310*b*, 310*c*, 320*a*, 320*b*, and 320*c* are directly coupled to the lead patterns of the plurality of FPCBs 200*a*, 200*b*, and 200*c* in the secondary protection devices 300*a*, 300*b*, and 300*c*, the attachment process of the secondary protection devices 300*a*, 300*b*, and 300*c* may be simplified to improve the productivity and reduce material costs.

In the battery pack according to the above described embodiments, a component for attaching the secondary protection device to the bare cell may be omitted to reduce manufacturing costs and improve the productivity.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims and their equivalents.

What is claimed is:

1. A battery pack comprising:
a bare cell;
a flexible printed circuit board comprising at least one portion contacting with the bare cell, the flexible printed circuit board being electrically coupled to the bare cell through a lead pattern surrounded by an insulation cover;
a secondary protection device on the flexible printed circuit board, the secondary protection device being electrically coupled to the flexible printed circuit board through the lead pattern; and
a protective circuit module electrically coupled to the flexible printed circuit board through the lead pattern, wherein a heat transfer unit for transferring heat generated in the bare cell to the secondary protection device is in a space between the secondary protection device and a first extending portion of the bare cell.

2. The battery pack as claimed in claim 1, wherein the lead pattern of the flexible printed circuit board comprises a first lead pattern, a second lead pattern, and a third lead pattern.

3. The battery pack as claimed in claim 2, wherein the protective circuit module comprises a first connection part and a second connection part, wherein the first connection part is coupled to the first lead pattern, and the second connection part is coupled to the third lead pattern.

4. The battery pack as claimed in claim 2, wherein the first lead pattern is coupled to a first tab of the secondary protection device, the second lead pattern is coupled to a second tab of the secondary protection device and a negative electrode tab of the bare cell, and the third lead pattern is coupled to a positive electrode tab of the bare cell.

5. The battery pack as claimed in claim 4, wherein an end of the first lead pattern and an end of the second lead pattern are on a contact part at which a first extending portion of the bare cell overlaps a portion of the flexible printed circuit board.

6. The battery pack as claimed in claim 2, wherein the insulation cover has a first opening at a position at which the first lead pattern is coupled to a first tab of the secondary protection device, a second opening at a position at which the second lead pattern is coupled to a second tab of the secondary protection device, a third opening at a position at which the second lead pattern is coupled to a negative electrode tab of the bare cell, and a fourth opening at a position at which the third lead pattern is coupled to a positive electrode tab of the bare cell.

7. The battery pack as claimed in claim 1, wherein the secondary protection device is on a contact part at which a first extending portion of the bare cell overlaps a portion of the flexible printed circuit board.

8. The battery pack as claimed in claim 1, wherein the heat transfer unit comprises aluminum (Al) or silicon carbide (SiC).

9. The battery pack as claimed in claim 1, wherein the bare cell comprises a plurality of bare cells.

10. The battery pack as claimed in claim 9, wherein the flexible printed circuit board comprises a plurality of flexible printed circuit boards electrically coupled to the plurality of bare cells, respectively.

11. The battery pack as claimed in claim 10, wherein the plurality of flexible printed circuit boards is integrally formed in one body.

12. The battery pack as claimed in claim 9, wherein the secondary protection device comprises a plurality of secondary protection devices on first extending portions of the plurality of bare cells, respectively.

* * * * *